(12) United States Patent
Farchtchian

(10) Patent No.: US 9,388,960 B2
(45) Date of Patent: Jul. 12, 2016

(54) LIGHTING UNIT COMPRISING A PHOSPHOR ELEMENT

(71) Applicant: OSRAM GmbH, Munich (DE)

(72) Inventor: Nadir Farchtchian, Berlin (DE)

(73) Assignee: OSRAM GmbH, Munich (DE)

( * ) Notice: Subject to any disclaimer, the term of this patent is extended or adjusted under 35 U.S.C. 154(b) by 24 days.

(21) Appl. No.: 14/365,971

(22) PCT Filed: Nov. 20, 2012

(86) PCT No.: PCT/EP2012/073110
§ 371 (c)(1),
(2) Date: Jun. 16, 2014

(87) PCT Pub. No.: WO2013/087374
PCT Pub. Date: Jun. 20, 2013

(65) Prior Publication Data
US 2014/0355240 A1    Dec. 4, 2014

(30) Foreign Application Priority Data

Dec. 16, 2011    (DE) .......................... 10 2011 088 791

(51) Int. Cl.
| | |
|---|---|
| *F21V 9/16* | (2006.01) |
| *H04N 9/31* | (2006.01) |
| *F21K 99/00* | (2016.01) |
| *F21V 13/08* | (2006.01) |
| *F21Y 101/02* | (2006.01) |

(52) U.S. Cl.
CPC ... *F21V 9/16* (2013.01); *F21K 9/56* (2013.01); *F21V 13/08* (2013.01); *H04N 9/315* (2013.01); *F21Y 2101/02* (2013.01)

(58) Field of Classification Search
CPC ...................................... F21V 1/10; F21V 1/12
See application file for complete search history.

(56) References Cited

U.S. PATENT DOCUMENTS

| | | | |
|---|---|---|---|
| 2005/0270775 A1* | 12/2005 | Harbers ............. | G02B 27/1046 362/231 |
| 2007/0035813 A1 | 2/2007 | Roth et al. | |
| 2007/0146639 A1 | 6/2007 | Conner | |

FOREIGN PATENT DOCUMENTS

| | | |
|---|---|---|
| CN | 101361022 | 2/2009 |
| DE | 10 2008 011 866 | 9/2009 |
| EP | 1 605 199 | 12/2005 |
| TW | 200604466 | 2/2006 |

* cited by examiner

Primary Examiner — Anne Hines
(74) Attorney, Agent, or Firm — Cozen O'Connor

(57) ABSTRACT

A lighting unit (1) comprising a phosphor element (2) provided for converting pump light to converted light and designed to emit conversion light at an emission surface (6), and at least two pump light sources (3, 8) configured for emitting pump light, wherein the lighting unit (1) is designed such that primary pump light emitted by a first pump light source (3) illuminates the phosphor element (2) at an incidence surface (5), which differs from the emission surface (6), and secondary pump light emitted by a second pump light source (8) illuminates the phosphor element (2) at the emission surface (6).

15 Claims, 2 Drawing Sheets

LIGHTING UNIT COMPRISING A PHOSPHOR ELEMENT

RELATED APPLICATIONS

This is a U.S. National stage of International application No. PCT/EP2012/073110 filed on Nov. 20, 2012.

This patent application claims the priority of German application no. 10 2011 088 791.1 filed Dec. 16, 2011, the disclosure content of which is hereby incorporated by reference.

FIELD OF THE INVENTION

The present invention relates to a lighting unit comprising a phosphor element provided for converting pump light to converted light.

BACKGROUND OF THE INVENTION

Compared with conventional incandescent lamps, light sources currently in development are distinguished by an increased energy efficiency, for example, but the emitted light is often limited to a narrow spectral range compared with the incandescent lamps exhibiting broadband emission as thermal radiators. If a light emitting diode (LED), for instance, is provided as a light source, a phosphor is usually applied directly to the LED in order to vary the spectral properties of the light. In other words, the LED semiconductor component emits blue pump light, for example, and the phosphor at least partly absorbs said light and emits converted light (conversion light) having a longer wavelength. The phosphor particles can for example also be embedded into a silicone matrix applied on the LED semiconductor component, the pump light radiating through said matrix during operation.

The present invention addresses the technical problem of specifying a lighting unit which is advantageous compared with the prior art.

SUMMARY OF THE INVENTION

One aspect of the present invention is directed to a lighting unit comprising a phosphor element designed to emit conversion light at an emission surface, and comprising at least two pump light sources designed for emitting pump light; here the lighting unit is designed such that primary pump light emitted by a first pump light source illuminates the phosphor element at an incidence surface, which differs from, and is preferably opposite, the emission surface, and secondary pump light emitted by a second pump light source illuminates the phosphor element at or on the emission surface.

According to an embodiment of the invention, therefore, the phosphor element is not only irradiated with primary light from the rear, that is to say operated in transmission, but also is additionally illuminated with secondary pump light from a different side, in particular "from the front", that is to say for instance in reflection. The secondary pump light is incident on the emission surface at which the converted light is emitted.

In other words, the emission surface which otherwise is provided solely for emitting converted light in the case of a phosphor element operated in transmission is used for coupling in additional pump light, which increases the quantity of pump light coupled in, that is to say for example the luminous flux or, to put it more generally, the radiation power coupled in. Accordingly, the quantity of converted pump light is also greater, that is to say that an increased luminous flux or an increased radiation power can also be achieved for the converted light. In comparison with a phosphor element that is structurally identical but is operated with only one pump light source in transmission, this advantageously results in a higher luminance (more luminous flux or radiation power is emitted per area element and projected solid angle). Since the emission area that is otherwise used only for emitting conversion light is illuminated with pump light, the increased radiation power can for instance also be achieved with a phosphor element of compact construction, which can advantageously help to reduce the space requirement thereof.

Such a lighting unit having high luminance can be applied in a wide variety of fields, in endoscopy for example as well as likewise in projection apparatuses, but also in room lighting and also in industrial and/or medical lighting applications in general.

The phosphor element can be for example a phosphor embedding matrix, for instance silicone already mentioned in the introduction or a ceramic into which phosphor particles are embedded. Preferably, however, the phosphor itself is applied as a layer to a substrate, for example (directly) to an LED semiconductor component. Generally, the phosphor provided can be for example a garnet phosphor of the form $A_x B_y C_z Al_5 O_{12}$ (with A, B, C comprising Y, Al, Lu, Ga, etc.), for example Ce-doped YAG, an orthosilicate phosphor or pure nitride phosphor; however the term "phosphor" also encompasses a mixture of a plurality of such phosphor types, that is to say pure phosphors.

The presence of an "emission surface" does not necessarily imply that converted light emerges solely at this surface; this would be possible, however, for instance in the case of a corresponding mirror-coating of side surfaces and a dichroic mirror-coating of the entrance surface. Even in the case of a phosphor element which emits hypothetically isotropically converted light, an emission surface that does not extend over the entire phosphor element could nevertheless be present, namely if converted light is tapped for a further use only at one side. "Emission surface" therefore means that surface of the phosphor element from which the converted light then made available further as useful light is principally emitted.

It goes without saying that the secondary pump light need not necessarily illuminate the entire emission surface, rather it is also possible for only a partial region to be illuminated, for instance with increasing preference in this order at least 5%, 10%, 20%, 30%, 40%, 50%, 60%, 70%, 80% of the emission surface.

The emission surface embodied for instance as an outer interface of the phosphor element does not necessarily run in a planar and/or continuous fashion, but rather can for example also be embodied in a curved fashion, for instance in the case of a hemisphere, and/or have edges or vertices, for example in the case of a pyramidal or conical shape; furthermore, a substructure is also possible, for instance a microstructure having, for example, surface steps in the manner of a Fresnel lens.

In the context of this disclosure, the term "pump light" relates firstly to electromagnetic radiation, the wavelength of which need not be restricted to the visible range, that is to say can for example also lie in the ultraviolet or infrared. "Lighting" should be understood correspondingly generally. On the other hand, "pump light" can also encompass corpuscular radiation, in particular with regard to the secondary pump light, that is to say for example electron or ion radiation; however LED or laser radiation is preferred.

Insofar as reference is made to light or the propagation thereof in this disclosure, light propagation need not necessarily actually take place in order to realize the subject matter, rather the device is intended merely to be designed for corresponding propagation.

Preferred configurations are specified in the dependent claims and are explained below, wherein the individual features in the entire disclosure can also be essential to the invention in different combinations and implicitly relate both to the lighting unit and to a lighting device comprising the latter, including with regard to use aspects.

Preferably, the lighting unit is designed such that the primary pump light emitted by the first pump light source is incident on the incidence surface of the phosphor element in a first main incidence direction at an angle of at most 45°, with increasing preference in this order at most 35°, 25°, 15°, 5°, with respect to a main emission direction of the conversion light. Particularly preferably, main emission direction and first main incidence direction are parallel to one another.

Generally, the main incidence direction of the pump light and the main emission direction of the converted light arise in each case as a centroid of directions of propagation (of the pump light and converted light, respectively) that are weighted according to the power. If the directions thus determined are regarded as vectors, the angle indications then always relate to the smaller of two angles measurable between the vectors (including in the case of angles between surface normals that are relevant later).

In a preferred configuration, the lighting unit is designed such that the secondary pump light emitted by the second pump light source is incident on the emission surface of the phosphor element at an angle of at least 135°, with increasing preference in this order at least 145°, 155°, 165°, 175°, with respect to the main emission direction. Particularly preferably, the angle is 180°, that is to say that the second main incidence direction and the main emission direction are exactly opposite. Even if, in principle, a pump light beam emitted by a laser, for example, can also impinge on the emission surface at a significantly shallower angle, an opposite orientation just mentioned is particularly preferred because then, for example, a common optical unit can also be provided for secondary pump light and converted light.

Such a common, preferably imaging, optical unit is generally advantageous, such that, for example, a converging lens on the one hand, concentrate the secondary pump light toward the emission surface and on the other hand, via the same converging lens, the converted light can be made available for a further use, for instance by the converging lens imaging the phosphor element to infinity. Such a system integration can help to reduce the number of individual components, which can be advantageous for example from the standpoint of costs.

Generally, that is to say not necessarily for both pump light and conversion light, (further) optical elements can be provided, for instance a primary lens and/or a wire grid polarizer; these can for example be directly adjacent to the emission surface of the phosphor element or be arranged at a small distance therefrom, for instance less than one millimeter away.

It is preferred, furthermore, for the first pump light source to be adjacent to the phosphor element and for the second pump light source to be arranged at a distance therefrom, for instance with a preferably imaging optical unit therebetween.

If an LED, for example, is provided as a first pump light source, the phosphor element can be provided for instance in a manner directly adjacent to the LED semiconductor component; "adjacent" is intended nevertheless not to rule out a light guiding layer between first pump light source and phosphor element, for instance an immersion layer for refractive index matching. Particularly preferably, however, the first pump light source is directly adjacent to the phosphor element, that is to say that, for example, a phosphor layer is directly applied to an LED semiconductor component.

In a preferred configuration, incidence and emission surfaces are arranged opposite one another, that is to say that the normals of incidence and emission surfaces together form an angle of at least 135°, with increasing preference in this order at least 145°, 155°, 165°. Particularly preferably, incidence and emission surfaces run parallel, which is intended to be fulfilled at an angle between the surface layer normals of, with increasing preference in this order, at least 175°, 176°, 177°, 178°, 179°. Ideally, the angle is 180°. The phosphor element can be embodied in a planar fashion, for example, that is to say extend in two areal directions and have only a relatively small extent perpendicularly thereto in the thickness direction.

In a further embodiment, the primary pump light and secondary pump light have substantially identical radiation spectra; the latter therefore coincide for instance, in a manner weighted according to wavelength-dependent power, to the extent of, with increasing preference in this order, 80%, 90%, 95%, 98%, especially preferably to the extent of 100%.

In a further configuration, which is also regarded as an invention independently of the features of the main claim and is intended to be disclosed in this form, the primary pump light and the secondary pump light can have at least partly different spectra. The secondary pump light can (also in general, but in particular in this embodiment) be composed for example of light from a plurality of light emitting diodes and/or laser diodes, for instance also from a combination of light emitting diode(s) and laser diode(s). In the last-mentioned case, for example, a narrowband laser emission can be superimposed on a broadband spectrum and thus supplement it at points.

On the other hand, for example, spectra which are at least substantially complementary to one another can also be present, which therefore coincide, for instance, in a manner weighted according to wavelength-dependent power, to the extent of, with increasing preference in this order, at least 50%, 40%, 30%, 20%. In this regard, for example, in the case of a phosphor element comprising a plurality of phosphor types, the respective excitation thereof can be improved, which advantageously increases the luminous efficiency.

Pump light having different spectral properties can be advantageous in particular also in conjunction with a further preferred embodiment, namely with a phosphor element constructed from a plurality of layers. In this case, the layers differ in at least one phosphor type, that is to say have different phosphors in accordance with the above definition.

Preferably, the layering is present relative to the abovementioned main emission direction of the conversion light, such that, for example, the primary pump light at the incidence surface impinges on a different layer than the secondary pump light at the emission surface. The secondary pump light provided according to the invention can then, in other words, be coordinated in particular with a layer situated at the surface of the emission surface, or with a layer near the surface, whereas the primary pump light can be optimized with regard to the layer(s) at the incidence surface. Even if a laser can also be provided in particular as a second pump light source, but in general also as a first pump light source, an LED is preferred, to be precise particularly preferred both as first and as second pump light source. Generally, the pump light sources can be designed to be operated with, for example, substantially constant power or alternatively in a pulsed fashion.

Both the first pump light source and the second pump light source can in each case be composed of a plurality of individual diodes (individual semiconductor components). In this regard, for instance, the second pump light source can be constructed from, for example, an arbitrary combination of light emitting diodes and laser diodes; the individual diodes can then be operated in each case by themselves, that is to say individually, or jointly, for instance driven in an arbitrary selection and temporal order. In this case, the different diodes can for example also illuminate different regions of the emission surface (or of the incidence surface in the case of the first pump light source).

In a preferred configuration, a dichroic mirror is provided in order to guide the secondary pump light emitted by the second pump light source onto the emission surface of the phosphor element, for example via an interposed optical unit, for instance a converging lens.

The mirror is preferably dichroic such that it at least partly reflects the pump light and at least partly transmits the converted light (conversely, a mirror that transmits pump light would also be possible, which then reflects the converted light in the direction of the application). The converted light can therefore be guided away from the phosphor element, without a deflection being effected by the mirror (if appropriate apart from a parallel offset resulting from the dichroic mirror). The second pump light source can correspondingly be arranged outside the beam path of the converted light and the secondary pump light can then be fed to the beam path via the dichroic mirror, to be precise in the opposite direction to the converted light and thus toward the emission surface.

Another aspect of the invention relates to a lighting device comprising an above-described lighting unit, the converted light of which in a first wavelength range is then supplemented with additional light emitted by a further light source and is combined in an optical element, for instance a converging lens. The additional light source can for example likewise be a phosphor element with pump light source, for example a phosphor element operated according to the invention with at least two pump light sources.

Preferably, however, in a lighting device, exactly one such lighting unit is provided, which is then supplemented by two light sources, for instance by LED semiconductor components. Overall, therefore, for example, three LEDs each of different colors can be provided; with red, green and blue, a white light source, for example, can thus be realized.

A dichroic mirror mentioned above can then advantageously not only serve for supplying one phosphor element with secondary pump light (and transmitting the converted light emitted by said phosphor element), but also directly light emitted by a further light source, that is to say for example blue light emitted by an LED, in the direction of the optical element. This allows a further system integration.

Such a lighting device or the above-described lighting unit can be used for a projection apparatus or endoscope, for room lighting purposes or else for industrial and/or medical applications in general.

BRIEF DESCRIPTION OF THE DRAWINGS

The invention is explained in greater detail below on the basis of exemplary embodiments, wherein the individual features can also be essential to the invention in other combinations.

In the figures, more specifically.

DETAILED DESCRIPTION OF THE DRAWINGS

Figure 1:
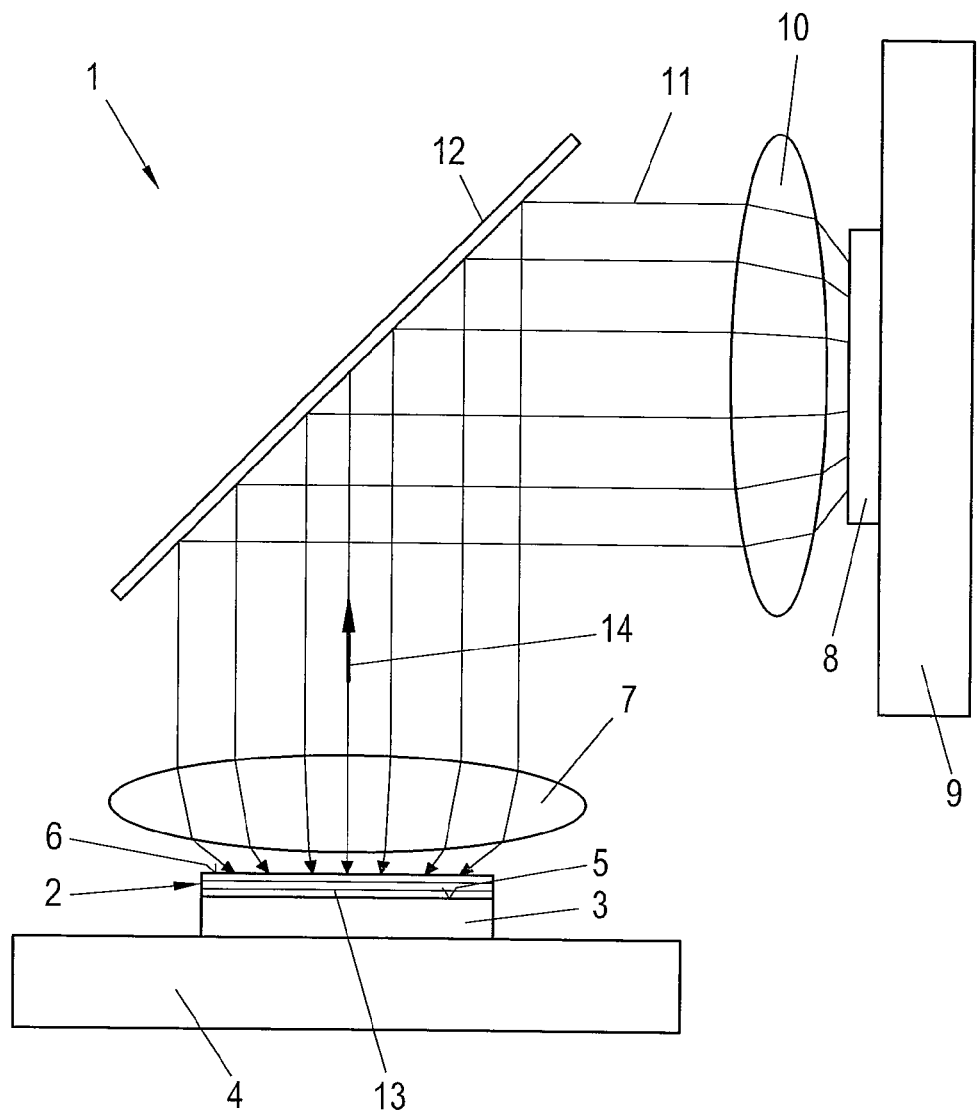
FIG. 1 shows a lighting unit according to an embodiment of the invention.

FIG. 1 shows a lighting unit 1 comprising a phosphor element 2, which is applied as a coating on an LED semiconductor component 3. The LED semiconductor component 3 is adhesively bonded or soldered onto a substrate 4, depending on thermal requirements.

The incidence surface 5 of the phosphor element 2 is in contact with the light emitting—in the blue wavelength range—surface of the LED semiconductor component 3, such that the phosphor element 2 is operated in transmission with the primary pump light emitted by this first pump light source 3. The blue primary pump light is in any case converted in the most part in the phosphor element 2, and the phosphor element 2 emits converted light at the emission surface 6. A converging lens 7 arranged opposite the emission surface 6 images this surface emitting converted light in the green spectral range to infinity.

In accordance with the invention, a second pump light source 8 is provided, namely a further LED semiconductor component 8, which likewise emits in the blue spectral range. Said component is in turn mounted on a substrate 9, although the surface of the semiconductor component 8 is not coated with phosphor. The surface emitting secondary pump light is instead imaged to infinity by a converging lens 10.

The blue secondary pump light 11 is then reflected at a dichroic mirror 12, to be precise in the direction of the first converging lens 7, which then focuses the secondary pump light 11 onto the emission surface 6 of the phosphor element 2.

The phosphor element 2 is therefore supplied with pump light not only by the first LED semiconductor component 3, but also by the second LED semiconductor component 6, which increases the luminous flux and thus also the luminance of the converted light. The phosphor element 2 emits converted light in the main emission direction 14.

The dichroic mirror 12, which is reflective for blue pump light, is transmissive for converted light, in the green spectral range in the present case. The converted light parallelized by the converging lens 7 therefore passes through the dichroic mirror 12 without being impeded and is then available to the application, for instance for lighting in a projection apparatus.

The phosphor element 2 is constructed from a plurality of layers 13 which differ in terms of the phosphor provided therein. The LED semiconductor components can now be chosen such that the first LED semiconductor component is optimized with regard to an excitation of the layer 13a and the second with respect to the excitation of the layer 13b.

Figure 2:
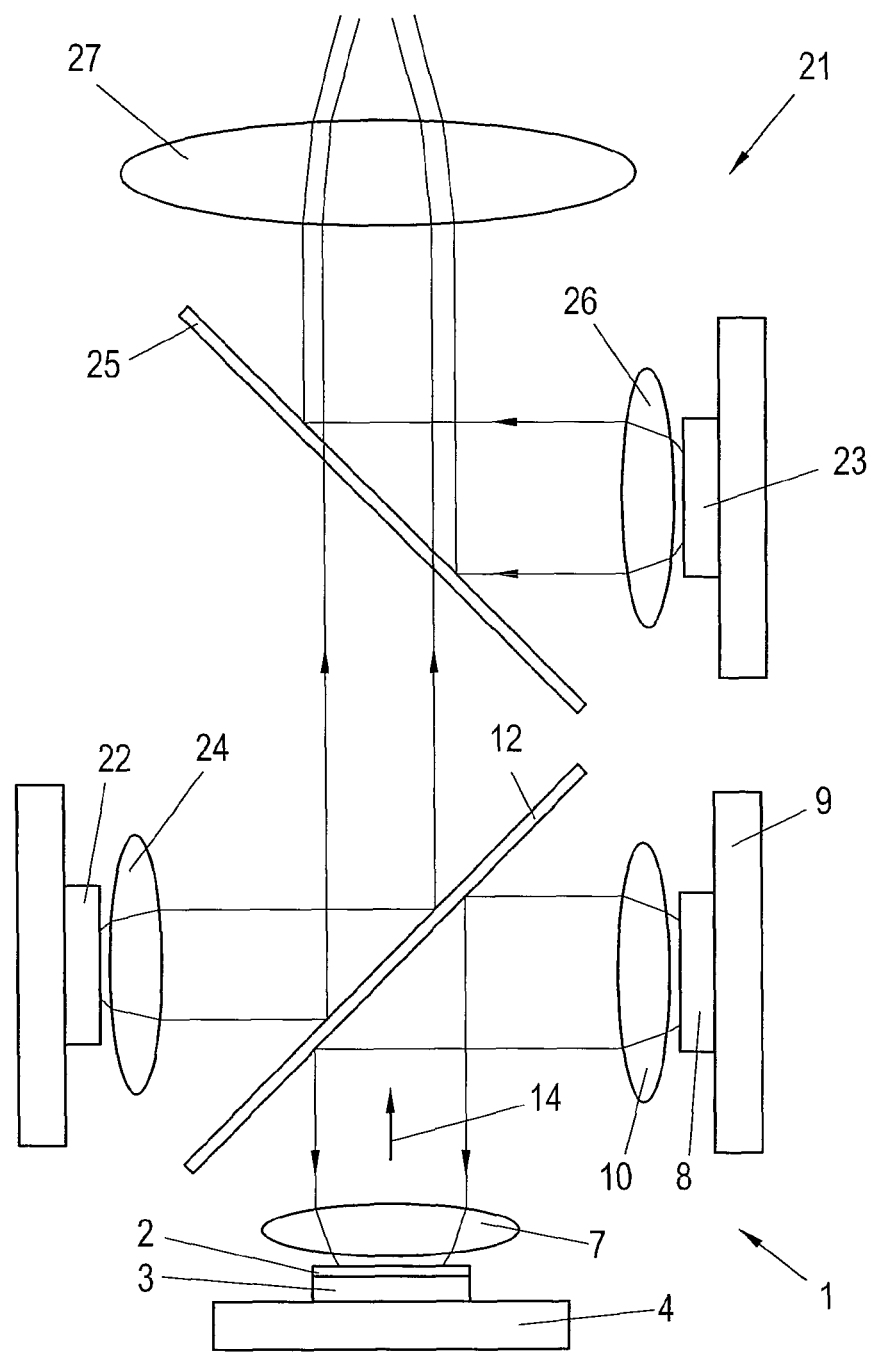
FIG. 2 shows a lighting device according to an embodiment of the invention.

FIG. 2 shows a lighting unit 1 explained with reference to FIG. 1 and supplemented by further light sources in a lighting device 21. The lighting unit 1, that is to say the combination of phosphor element 2, first pump light source 3 and second pump light source 8, is provided for emitting green light. A light emission amplified by a second pump light source 8 according to the invention has proved to be particularly advantageous in the green spectral range because the luminosity curve has its maximum there, such that the brightness in the green spectral range has a significant influence on the brightness of the overall system.

The additional light sources are likewise LED semiconductor components, to be precise a semiconductor component 22 for emitting blue light and an LED semiconductor component 23 for emitting red light. The light emitted by the blue LED semiconductor component 22 is parallelized by a converging lens 24 and then directed by the dichroic mirror 12, which is reflective for blue light, into the beam path of the green light emitted by the lighting unit 1, that is to say is brought for mixing with the green light. The dichroic mirror 12 therefore advantageously serves on the one hand for supplying the phosphor element 2 with secondary pump light and makes it possible on the other hand to couple (additional) blue light into the beam path of the converted light that is fed to an application.

A further dichroic mirror 25 is reflective solely in the red spectral range and thus couples the red light guided from the LED semiconductor component 23 via the converging lens 26 into the beam path which is then fed to the application via a further converging lens 27. The dichroic mirror 25 is transmissive for the green and blue light, such that white light is available to the application if all the LED semiconductor components are in operation; a color mixing is also possible by means of an individual driving of the LED semiconductor components.

The invention claimed is:

1. A lighting unit comprising:
   a phosphor element provided for converting pump light to converted light and designed to emit conversion light at an emission surface, and
   at least two pump light sources configured for emitting pump light,
   wherein the lighting unit is designed such that primary pump light emitted by a first pump light source illuminates the phosphor element at an incidence surface, which differs from the emission surface, and secondary pump light emitted by a second pump light source illuminates the phosphor element at the emission surface, and
   wherein the first pump light source is adjacent to the phosphor element and the second pump light source is arranged at a distance therefrom.

2. The lighting unit as claimed in claim 1, which is configured such that the primary pump light emitted by the first pump light source is incident on the incidence surface of the phosphor element in a first main incidence direction at an angle of at most 45° with respect to a main emission direction of the conversion light.

3. The lighting unit as claimed in claim 1, which is configured such that the secondary pump light emitted by the second pump light source is incident on the emission surface of the phosphor element in a second main incidence direction at an angle of at least 135° with respect to a main emission direction of the conversion light.

4. The lighting unit as claimed in claim 1, wherein the incidence surface and the emission surface are parallel to one another.

5. The lighting unit as claimed in claim 1, further comprising a common optical unit provided for the secondary pump light and the converted light.

6. The lighting unit as claimed in claim 1, wherein the primary pump light and the secondary pump light have substantially identical spectra.

7. The lighting unit as claimed in claim 1, wherein the primary pump light and the secondary pump light have at least partly different spectra.

8. The lighting unit as claimed in claim 1, wherein the phosphor element comprises a plurality of layers having at least one different phosphor type.

9. The lighting unit as claimed in claim 8, wherein the phosphor element comprises a plurality of layers oriented perpendicular to a main emission direction of the conversion light.

10. The lighting unit as claimed in claim 1, wherein at least one of the first and second pump light sources comprises an LED.

11. The lighting unit as claimed in claim 1, further comprising a dichroic mirror configured to guide the secondary pump light emitted by the second pump light source onto the emission surface of the phosphor element.

12. The lighting unit as claimed in claim 11, wherein the dichroic mirror is configured to reflect the pump light and to transmit the converted light.

13. A lighting device comprising a lighting unit as claimed in claim 1, and comprising an additional light source, which is configured to emit additional light, wherein the converted light and the additional light are combined in an optical element.

14. The lighting device as claimed in claim 13, wherein the light emitted by the lighting unit and the light emitted by the additional light source have at least partly different spectra.

15. The lighting device as claimed in claim 13,
    further comprising a dichronic mirror configured to guide the secondary pump light emitting by the second pump light source onto the emission surface of the phosphor element,
    wherein the dichronic mirror is configured to reflect pump light and to transmit converted light, and
    wherein the dichroic mirror is configured such that it directs the light emitted by the additional light source in the direction of the optical element.

* * * * *